(No Model.) 2 Sheets—Sheet 1.

G. COMMICHAU.
FLEXIBLE TUBING.

No. 499,713. Patented June 20, 1893.

Witnesses.
J. M. Copenhaver
A. C. Rawlings

Inventor
Gotthard Commichau
by John J. Halsted & Son
his Attys.

(No Model.) 2 Sheets—Sheet 2.
G. COMMICHAU.
FLEXIBLE TUBING.
No. 499,713. Patented June 20, 1893.
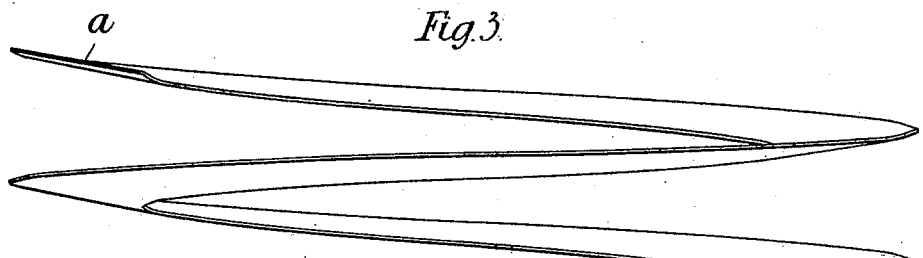
Fig. 3.
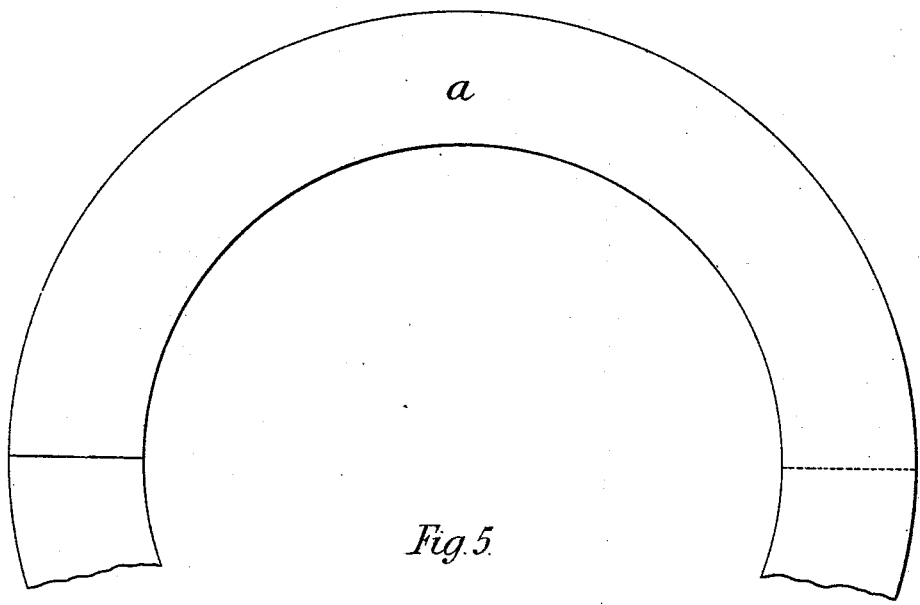
Fig. 4.
Fig. 5.
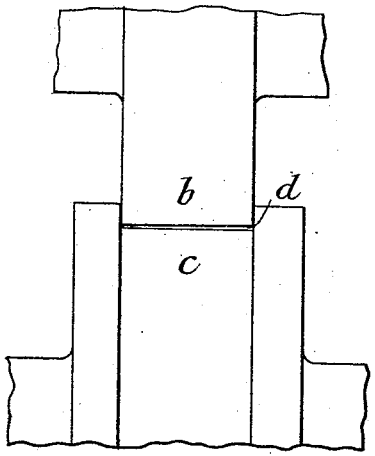
Witnesses:
Y. M. Copenhaver
A. C. Rawlings
Inventor:
Gotthard Commichau
by John J. Halsted & Son
his Attys.

UNITED STATES PATENT OFFICE.

GOTTHARD COMMICHAU, OF MAGDEBURG-SUDENBURG, GERMANY.

FLEXIBLE TUBING.

SPECIFICATION forming part of Letters Patent No. 499,713, dated June 20, 1893.

Application filed September 22, 1892. Serial No. 446,582. (No model.) Patented in Germany May 29, 1890, No. 55,692, and in England December 3, 1890, No. 19,731.

*To all whom it may concern:*

Be it known that I, GOTTHARD COMMICHAU, a subject of the Emperor of Germany, residing at Magdeburg-Sudenburg, Germany, have invented new and useful Flexible Tubing, (which invention has been partly patented to me in Germany by Letters Patent No. 55,692, dated May 29, 1890, and in Great Britain by Letters Patent No. 19,731, dated December 3, 1890,) of which the following is a specification.

My invention relates to the manufacture of flexible tubing which is especially applicable for the spouts of grain or seed drills but which is also applicable for conducting other materials from one place to another and also as a protective covering or armor for india-rubber tubes or hose, cables and the like and for other purposes.

In manufacturing my improved tubing I provide a helical metallic strip, each convolution of which is slightly conical and I coil this strip so that the convolutions resulting therefrom will represent a series of funnels or cones one within the other, the tubing produced having practically the same diameter throughout.

To enable my invention to be fully understood I will describe the same by reference to the accompanying drawings, in which—

Figure 1:
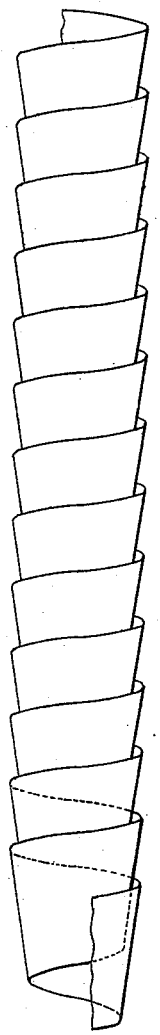
Figure 2:
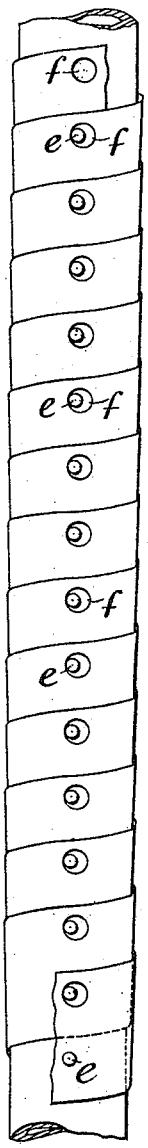
Figure 6:

Figure 1 is an elevation of a piece of tube manufactured according to my invention and especially designed for use as a spout or conveyer for grain, seeds and other materials. Fig. 2 is an elevation of a piece of my tubing adapted to serve as an armor for an india-rubber hose. Figs. 3 and 4 are an elevation and a plan respectively of a portion of the helical strip which when coiled up forms my tubing. Fig. 5 is a view illustrating a suitable arrangement of rollers for making the helical strip; and Fig. 6 is a vertical section through one of the coils of the tube represented in Fig. 2.

Similar letters of reference indicate corresponding parts in all the figures.

$a$, Figs. 3 and 4, indicates my helical strip which is advantageously formed by passing a flat strip between two rollers, the adjacent faces of which form a slight angle so that one edge of the strip will be more or less compressed and thereby lengthened.

$b$ and $c$ in Fig. 5 represent adjacent portions of two of such rollers, and $d$ indicates the space between the same, which space as will be noticed is of greater height at one side of the rollers than at the other. As a result of rolling the strip in this manner it takes a helical form, as shown in Figs. 3 and 4, the convolutions being more or less conical according to the angularity of the space between the rollers $b$, $c$. The strip thus formed is wound upon a mandrel in such a manner that as the strip is wound or coiled the longer or outer edge of each convolution will overlap the short or inner edge of the convolution last wound, as shown clearly in Fig. 1. A tube thus formed is practically of the same diameter throughout is very extensible, and can be readily adapted to any different positions which it may be required to take.

When my tubing is used as an armor for india-rubber tubes, cables and the like it is advisable to limit the movement of the convolutions relatively to each other, that is to say, to allow a certain amount of movement which may be necessary to permit of the bending of the tube or cable while at the same time the convolutions are prevented from becoming separated. For this purpose I advantageously place, at suitable distances apart, upon the inner or short edge of the metallic strip, pins $e$, $e$, as shown at Figs. 2 and 6 and, at corresponding distances apart upon the outer or long edge of the strip, I form holes $f, f$, the said holes being made somewhat larger than the pins in order to allow of the necessary flexibility. A section of the strip thus provided with pins and holes is shown at Fig. 6.

Having now particularly described and ascertained the nature of my said invention and in what manner the same is to be performed, I declare that what I claim is—

1. A flexible tubing formed from a metallic strip having a gradually reduced thickness from edge to edge, and having convolutions which are slightly conical, the said strip being coiled as described whereby the different convolutions thereof form funnels or cones one within the other, substantially as described.

2. Flexible metallic tubing formed from a helical metallic strip, the convolutions of which are slightly conical, the said strip being provided with pins upon one edge and holes at the other edge whereby the holes engage with the pins, substantially as, and for the purposes described.

GOTTHARD COMMICHAU.

Witnesses:
 FR. SANGER,
 OTTO WEBER.